United States Patent
Koren

(10) Patent No.: US 7,584,056 B2
(45) Date of Patent: Sep. 1, 2009

(54) MULTIPLE SUPPRESSION IN ANGLE DOMAIN TIME AND DEPTH MIGRATION

(75) Inventor: Zvi Koren, Raanana (IL)

(73) Assignee: Paradigm Geophysical Ltd., Herzliya (IL)

( * ) Notice: Subject to any disclaimer, the term of this patent is extended or adjusted under 35 U.S.C. 154(b) by 215 days.

(21) Appl. No.: 11/358,296

(22) Filed: Feb. 22, 2006

(65) Prior Publication Data

US 2006/0185929 A1    Aug. 24, 2006

Related U.S. Application Data

(60) Provisional application No. 60/654,507, filed on Feb. 22, 2005.

(51) Int. Cl.
 *G01V 1/28* (2006.01)
 *G01V 1/30* (2006.01)
 *G01F 19/00* (2006.01)
 *G06F 17/40* (2006.01)

(52) U.S. Cl. .......................... 702/14; 175/50; 181/101; 367/7; 367/14; 367/37; 367/38; 702/6; 702/11; 702/17; 702/189; 702/190; 702/191

(58) Field of Classification Search ............... 702/1–14, 702/17, 127, 187, 189, 190, 191, 193; 367/101, 367/7, 8, 9, 12, 14, 37, 38, 43, 87, 99; 175/40, 175/41, 50; 181/0.5, 101, 108, 113, 122, 181/123, 125
See application file for complete search history.

(56) References Cited

U.S. PATENT DOCUMENTS

| 2,144,812 | A | * | 1/1939 | Rieber | ......................... 367/59 |
| 2,354,548 | A | * | 7/1944 | Ricker | ......................... 367/75 |
| 2,394,990 | A | * | 2/1946 | Eisler et al | ..................... 367/36 |
| 2,658,579 | A | * | 11/1953 | Rieber | ......................... 367/71 |
| 2,732,906 | A | * | 1/1956 | Mayne | ....................... 367/59 |
| 2,879,860 | A | * | 3/1959 | Tilley | .......................... 367/63 |
| 2,908,889 | A | * | 10/1959 | Piety | ........................... 367/63 |
| 2,923,367 | A | * | 2/1960 | Cox | ............................. 367/34 |
| 2,926,331 | A | * | 2/1960 | Lindsey | ....................... 367/74 |
| 2,927,656 | A | * | 3/1960 | Feagin et al. | ................ 367/50 |

(Continued)

FOREIGN PATENT DOCUMENTS

EP    1 850 150 A1 * 10/2007

(Continued)

OTHER PUBLICATIONS

International Search Report of Application No. PCT/IL06/00234 dated Sep. 7, 2006.

(Continued)

*Primary Examiner*—Edward R Cosimano
(74) *Attorney, Agent, or Firm*—Pearl Cohen Zedek Latzer, LLP

(57) ABSTRACT

Seismic data may be imaged using or recognizing substantially only primary reflections. Imaging seismic data may include for example integrating a plurality of seismic data points that have substantially similar arrival directions, for example, to a modeled primary ray. Seismic data points may be imaged that for example substantially meet a set of predetermined conditions, for example, conditions substantially unique to primaries, which may include for example arrival direction and angle of reflection.

25 Claims, 4 Drawing Sheets

U.S. PATENT DOCUMENTS

| | | | | |
|---|---|---|---|---|
| 3,040,833 | A * | 6/1962 | Mendenhall et al. | 367/61 |
| 3,041,578 | A * | 6/1962 | Elliott | 367/43 |
| 3,217,289 | A * | 11/1965 | Elliott et al. | 367/40 |
| 3,274,543 | A * | 9/1966 | McCollum | 367/59 |
| 3,354,985 | A * | 11/1967 | Sparks | 367/56 |
| 3,363,229 | A * | 1/1968 | Miller, Jr. et al. | 367/43 |
| 3,363,230 | A * | 1/1968 | Bemrose | 367/47 |
| 3,408,622 | A * | 10/1968 | Cox | 367/48 |
| 3,418,625 | A * | 12/1968 | Anstey | 367/40 |
| 3,431,999 | A * | 3/1969 | Glazier | 367/56 |
| 3,472,334 | A * | 10/1969 | Snodgrass | 367/61 |
| 3,533,057 | A * | 10/1970 | Woods et al. | 367/52 |
| 3,691,529 | A * | 9/1972 | Pizante | 367/52 |
| 4,561,076 | A * | 12/1985 | Gritsch | 367/88 |
| 4,596,005 | A * | 6/1986 | Frasier | 367/38 |
| 4,597,066 | A * | 6/1986 | Frasier | 367/38 |
| 4,611,311 | A * | 9/1986 | Frasier | 367/38 |
| 4,759,636 | A * | 7/1988 | Ahern et al. | 367/21 |
| 4,924,390 | A * | 5/1990 | Parsons et al. | 702/14 |
| 4,964,089 | A * | 10/1990 | Wang et al. | 367/73 |
| 4,964,097 | A * | 10/1990 | Wang et al. | 367/73 |
| 4,980,866 | A * | 12/1990 | Wang et al. | 367/52 |
| 4,992,996 | A * | 2/1991 | Wang et al. | 367/53 |
| 5,050,131 | A * | 9/1991 | Wang et al. | 367/73 |
| 5,128,899 | A * | 7/1992 | Boyd et al. | 367/50 |
| 5,157,637 | A * | 10/1992 | Wang | 367/38 |
| 5,189,643 | A * | 2/1993 | Wang et al. | 367/38 |
| 5,229,940 | A * | 7/1993 | Wang et al. | 702/16 |
| 5,852,588 | A | 12/1998 | De Hoop et al. | |
| 5,933,789 | A * | 8/1999 | Byun et al. | 702/17 |
| 6,691,075 | B1 | 2/2004 | Winbow et al. | |
| 6,826,484 | B2 * | 11/2004 | Martinez et al. | 702/14 |
| 7,095,678 | B2 * | 8/2006 | Winbow et al. | 702/16 |
| 2005/0143921 | A1 * | 6/2005 | Winbow et al. | 702/14 |
| 2008/0109168 | A1 * | 5/2008 | Koren et al. | 702/16 |

FOREIGN PATENT DOCUMENTS

JP            61-107182 A * 5/1986

OTHER PUBLICATIONS

Koren, et al.: "Target-Oriented Common Reflection Angle Migration", Paradigm Geophysical Ltd., Dan Kosloff. Tel-Aviv University, 2002.

Sverre Brandsberg-Dahl, Maarten V. De Hoop, and Bjørn Ursin "Velocity analysis in the common scattering-angle/azimuth domain" SEG Expanded Abstracts 18, 1715 (1999).

A. J. Berkhout, D. J. Verschuur "Estimation of multiple scattering by iterative inversion, Part I: Theoretical considerations" Geophysics, vol. 62, No. 5 (Sep.-Oct. 1997); p. 1586 - 1595, 8 FIGS.

A. J. Berkhout, D. J. Verschuur "Estimation of multiple scattering by iterative inversion, Part II: Practical aspects and examples" Geophysics, vol. 62, No. 5 (Sep.-Oct. 1997); p. 1596- 1611, 18 Figs.

Marie L. Prucha, Biondo L. Biondi, and William W. Symes "Angle-domain common image gathers by wave-equation" In Extended Abstracts, pp. 824-827, Soc. Expl. Geophys, 1999.

Douglas J. Foster, Charles C. Mosher Suppression of multiple reflections using the Radon transform Geophysics 57, 386 (Mar. 1992).

D. Miller, M. Oristaglio, G. Beylkin "A new slant on seismic imaging: Migration and integral geometry" Geophysics, vol. 52, No. 7 (Jul. 1987); p. 943-964, 20 FIGS.

Sheng Xu, Herve Chauris, Gilles Lambare, Mark Noble "Common-angle migration: A strategy for imaging complex media" Geophysics, vol. 66, No. 6 (Nov.-Dec. 2001); p. 1877.

Enders A. Robinson "Predictive Decomposition of Seismic Traces" Geophysics 22, 767 (Oct. 1957).

Sheng Xu, Hervé Chauris, Gilles Lambaré, and Mark Noble" Common angle image gather: A strategy for imaging complex media" SEG Expanded Abstracts 17,1538 (1998).

Dan Hampson "Inverse Velocity Stacking For Multiple Elimination" Journal Of The Canaoiain Society Of Exploration Geophysicists, vol. 22, Dec. 1986, pp. 44-55.

De Hoop, Maarten V., Burridge, Robert, Spencer, Carl, Miller, Douglas "(GRT/AVA) migration/inversion in anisotropic media" Proc. SPIE vol. 2301, p. 15-27, 1994.

Kennett, B. L. N., (1979), "The suppression of surface multiples on seismic records" Geophys. Prosp. 27, No. 3, 584-600.

Koren, Z., and Kosloff, D, (2001), Common reflection angle migration, a special issue of the JSE, Seismic True Amplitudes, edited by Martin Tygel (in press).

Nolan, C. And Symes, W. (1996). "Imaging Within complex velocities with general acquisition geometry" Technical Report, TRIP, The Rice Inversion Project (Rice University).

ten Koode, A. P. E., Smit, D.J., and Verdel, A.R. (1994). "Linearized inverse scattering in the presence of caustics" In Expanded Abstracts. SPIE.

D.J Verschuur, A.J. Berkhout "Surface-Related Multiple Elimination: Application on Real Data" C.P.A Wapenaar, Delft Univ. of Technology, Netherlands, pp. 1476- 1479, 1991.

Chapman, C. H., 1985, "Ray theory and its extensions: WKBJ and Maslov seismogram" Journal of Geophysics, 58, pp. 27-43, 1985.

* cited by examiner

MULTIPLE SUPPRESSION IN ANGLE DOMAIN TIME AND DEPTH MIGRATION

PRIOR APPLICATION DATA

The present application claims the benefit of now expired prior provisional application serial number 60/654,507, filed on Feb. 22, 2005, entitled "System and Method for Multiple Suppression in Angle Domain Time and Depth Migration", incorporated by reference herein in its entirety.

BACKGROUND OF THE INVENTION

A transmitter may transmit signals, for example, acoustic waves, compression waves or other energy rays or waves, that may travel through subsurface structures. The transmitted signals may become incident signals that are incident to subsurface structures. The incident signals may reflect at various transition zones or geological discontinuities throughout the subsurface structures. The reflected signals may include seismic events. A receiver may collect data, for example, reflected seismic events. The data may be sent to a modeling mechanism that may include, for example, a data processing mechanism and an imaging mechanism.

Seismic events may include, for example, primary reflection energies (e.g., "primaries") and multiple reflection energies (e.g. "multiples"). Primaries may be seismic events whose energy has been reflected off a surface one time. Multiples, in contrast, may be seismic events whose energy has been reflected off more than one surface, and thus reflected multiple times.

Primaries may be used to image subsurface geological structures, for example, transition surfaces or geological discontinuities. However, primaries in seismic events may be obscured by multiples. One goal of seismic data processing is to isolate primary reflections from seismic events for imaging subsurface structures. Primaries may be isolated by various data processing methods, for example, by multiple suppression mechanisms.

Modeling mechanisms may include, for example, two separate and in-line operations. Firstly, a data processing mechanism may read complete seismic data that typically includes primaries and multiples and may isolate primaries. Secondly, an imaging mechanism may construct images using the isolated primary data.

A need exists for a more efficient subsurface modeling system, one that more efficiently isolates primaries and provides images of subsurface features.

SUMMARY

In accordance with an embodiment of the present invention, primary reflected events may be recognized or filtered during seismic imaging. For example, an imaging mechanism may input complete seismic events, containing both primaries and multiples, and image substantially only primaries. The imaging mechanism may be insensitive to or may not read substantially high amplitude multiple signals.

An imaging mechanism in accordance with an embodiment of the present invention may include a conventional modeling mechanism, for example, a ray tracing mechanism, that may generate simulated primary reflected events or center signals. Uniform illumination of simulated signals as is known, may provide uniform modeling of reflected seismic data points.

An imaging mechanism in accordance with an embodiment of the present invention may include, for example, a beam stack mechanism, for example, a local slant stack (LSS) operator; other suitable beam stack mechanisms may be used. The beam stack mechanism may image reflected events in a neighborhood of the primary center signal that meet certain conditions. For example, neighboring reflected events that surround a center signal may be imaged if they have the same travel time and arrival direction as the primary center signals. Other conditions for imaging may be used.

A beam stack mechanism may form reflected events from a set of neighboring data points which, in addition to travel times, also share the same free surface arrival direction. The reflected signals from data points of multiples, containing the same travel times, but different arrival directions, as primary reflections, may be ignored or strongly attenuated.

For example, a beam stack mechanism may integrate, sum or average neighboring reflected signals to form a single reflected event. Since each group of reflected events in the neighborhood of a primary center signal has substantially the same arrival direction and travel time, among other signal properties, as a primary center signal, those reflected events may also substantially only be primaries.

In one embodiment, the imaging mechanism may only image reflected seismic signals that meet a predetermined set of conditions. The predetermined set of conditions may be substantially unique to primaries, for example, specific arrival directions, travel times, directions of reflected signals, angles of reflection, arrival locations on a free surface or any other suitable conditions or combination of conditions. For example, reflected seismic signals may be imaged if they span a neighborhood of a primary central signal, have appropriate travel times, have substantially the same arrival directions as the center signal, and meet any other suitable conditions for primary events. For example, substantially high amplitude multiples may not meet the set of predetermined conditions. Thus substantially high amplitude multiples may be ignored and not read or imaged by the imaging mechanisms or processes.

BRIEF DESCRIPTION OF THE DRAWINGS

The principles and operation of the system, apparatus, and method according to embodiments of the present invention may be better understood with reference to the drawings, and the following description, it being understood that these drawings are given for illustrative purposes only and are not meant to be limiting.

Figure 1:
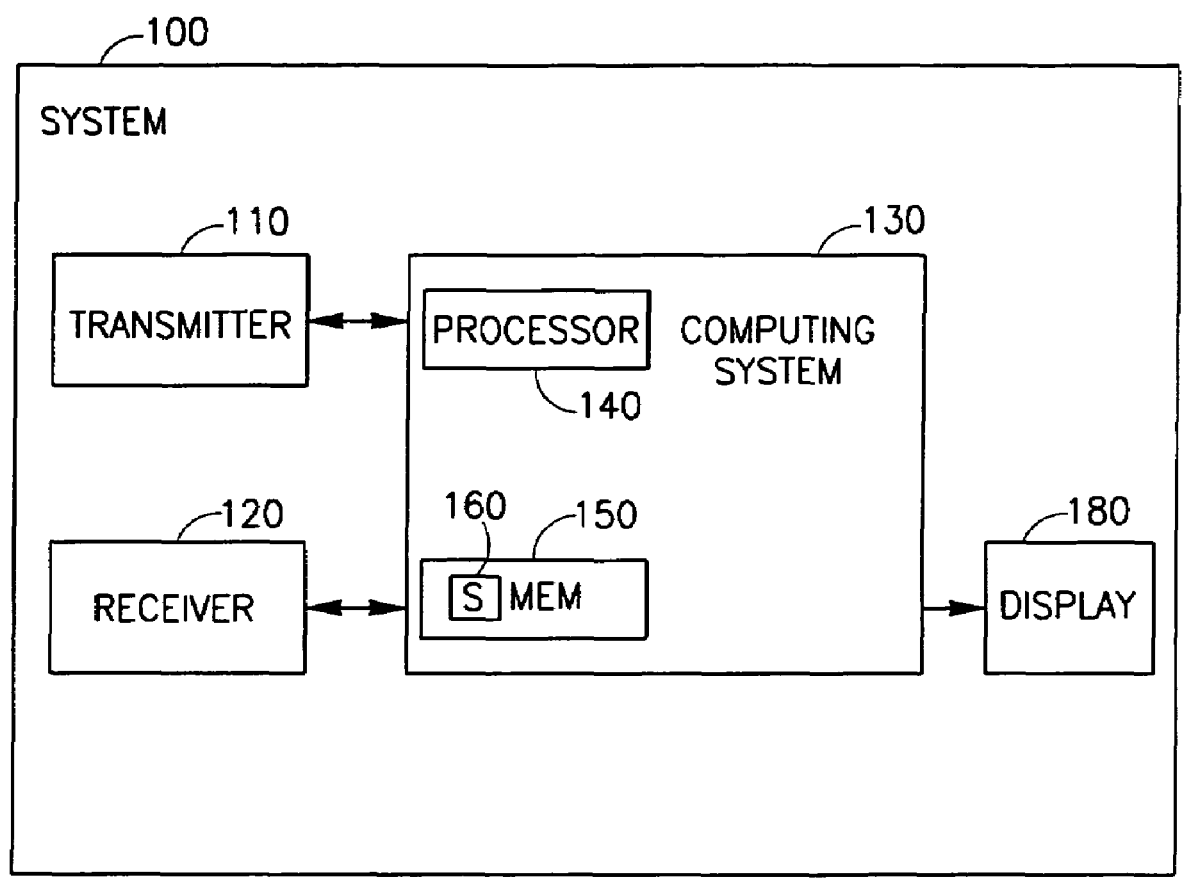
FIG. 1 is a schematic illustration of a system including a transmitter, receiver and computing system in accordance with an embodiment of the present invention.

For simplicity and clarity of illustration, elements shown in the drawings have not necessarily been drawn to scale. For example, the dimensions of some of the elements may be exaggerated relative to other elements for clarity. Further, where considered appropriate, reference numerals may be repeated among the drawings to indicate corresponding or analogous elements throughout the serial views.

DETAILED DESCRIPTION OF THE INVENTION

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well known features may be omitted or simplified in order not to obscure the present invention. Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices. In addition, the term "plurality" may be used throughout the specification to describe two or more components, devices, elements, parameters and the like.

Embodiments of the present invention may model and/or image subsurface structures. An imaging mechanism in accordance with an embodiment of the present invention may isolate or recognize primaries (or ignore multiples), or suppress substantially high amplitude multiples, for example, substantially simultaneously to imaging the primaries. In one embodiment, a common reflection angle migration (CRAM) mechanism may be used as an imaging mechanism. One CRAM mechanism was discussed at the EAGE 64$^{th}$Conference, and described in a publication: "Target-Oriented Common Reflection Angle Migration", Zvi Koren and Sheng Xu, Paradigm Geophysical Ltd., Dan Kosloff, Tel-Aviv University, published in 2002. A CRAM mechanism may construct each reflected signal by summing all reflected signals that may correspond to a reflection point, for example, reflected signals that may have the same reflection angle, travel time, or other suitable conditions.

The imaging mechanism may construct images substantially only from primary reflections. The imaging mechanism may include or make use of a modeling mechanism, for example, a ray tracing mechanism, which may generate substantially only primary rays. Each pair of primary rays may correspond to a primary modeled center signal.

A LSS operator may be added to the imaging mechanism, for example, within a migration computation, that may filter or cause the process to ignore multiples. Using the LSS operator, substantially only primary reflected events in a neighborhood corresponding to the primary center signal may be imaged. Primary neighboring reflected events may have travel times and arrival directions appropriate to primaries. For example, primary neighboring reflected events may have the same arrival direction as a primary center signal and may have travel times that correspond to the travel time of the corresponding center signal with an appropriate time shift. Thus, in one embodiment, multiple neighboring reflected events, containing appropriate travel times to primaries, may be ignored or strongly attenuated, since their arrival directions are substantially different from the corresponding center signal.

Reference is made to FIG. 1, which is a diagram of a system in accordance with an embodiment of the invention. System 100 may include a transmitter 110, a receiver 120, a computing system 130, and a display 180. Transmitter 110 may output any suitable signals, or generate incident signal(s). For example, a series of sonic or seismic energy rays or waves may be emitted from each of multiple locations. System 100 may include receiver 120, which may accept reflected signal(s) that correspond or relate to incident signals, sent by transmitter 110.

Computing system 130 may include for example processor 140, memory 150 and software 160. Display 180 may display data from transmitter 110, receiver 120, or computing system 130 or any other suitable systems, devices, or programs, for example, an imaging program or a transmitter or receiver tracking device. Display 180 may include one or more inputs or outputs for displaying data from multiple data sources or to multiple displays.

Computing system 130 may include, for example, any suitable processing system, computing system, computing device, processing device, computer, processor, or the like, and may be implemented using any suitable combination of hardware and/or software.

Processor 140 may include, for example, one or more processors, controllers or central processing units ("CPUs"). Software 160 may be stored, for example, in memory 150. Software 160 may include any suitable software, for example, CRAM mechanisms or software.

An imaging mechanism or process, for example, a CRAM mechanism, may generate common reflection angle gatherers (CRAG). A CRAM mechanism may include a ray-based migration/inversion technique for the construction of CRAGs, for example, common image gathers (CIGs) that may be constructed in the reflection angle domain. CRAGs may be constructed using conventional wave equation migration mechanisms.

The imaging mechanism may image signals that meet a set of predetermined conditions substantially unique to primaries, for example, that have travel times and orientations substantially unique to primaries. The imaging mechanism may also image signals that have specific ray paths, geometrical spreading, phase rotation factors or any other conditions substantially unique to primaries. Other imaging mechanisms may be used.

Figure 2:
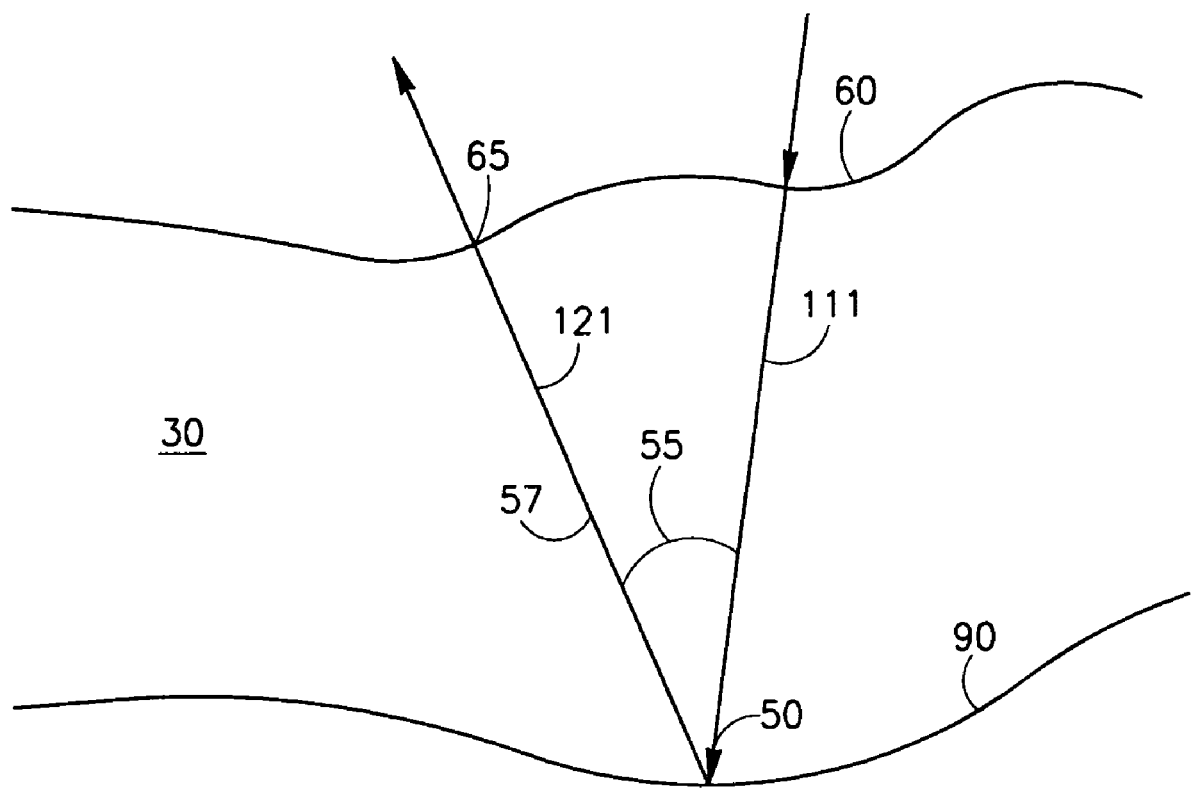
FIG. 2 is a schematic illustration of incident and reflected signals propagating through a cross-section of a subsurface structure according to an embodiment of the invention.

Reference is made to FIG. 2, which is a schematic illustration of incident and reflected signals propagating through a cross-section of a subsurface structure according to an embodiment of the invention. Reflection signal 121 may correspond to or be the reflected image of incident signal 111, for example, after reflecting off of image surface 90 at target point 50. The angle of reflection 55 may be the angle between corresponding incident signal 111 and reflected signal 121 at reflection point 50. An incident signal 111 and a corresponding reflected signal 121 may propagate through a cross-section of a subsurface structure 30. Incident signals 111 may reflect off of a subsurface feature 90 at a reflection point 50, for example, a point on an underground horizon, the seafloor, an underground aquifer, etc.

Each incident signal 111 reflected off of a reflection point 50 may generate both primary and multiple reflected signals 121. For example, there may be more reflected signals 121 than incident signals 111. Thus, receiver 120 may receive reflected signals 121 more frequently than transmitter 110 emits incident signals 111. Receiver 120 may send data that relates to reflected signals 121 to computing system 130.

If the reflected signal 121 is a primary such that, for example, it reflects substantially only once before reaching a free surface 60, as for example illustrated in FIG. 2, then according to one embodiment of the present invention, the imaging mechanism may use primary reflected signal 121 to image reflection point 50. If a reflected signal is a multiple, for example, such that it reflects off of a surface more than once, the imaging mechanism may not recognize, input or image the signal.

The incident signal 111 may include for example a plurality of energy rays or waves that may be emitted by transmitter 110 and may be incident on and reflect off a subsurface structure or surface 90 at a reflection point 50. Multiple reflection points 50 may be identified or imaged or displayed in conjunction to display, for example, a horizon. Reflection signal 121 may include a plurality of energy rays that may be received by receiver 120. For example signal 121 may be or include seismic events that include primaries and multiples.

According to embodiments of the present invention, an imaging mechanism, for example, a CRAM mechanism, may image reflection points 50, using corresponding reflected signals 121. For example, a CRAM mechanism may image reflection points 50, by using substantially only primary reflected signals 121 that may reflect off of the subsurface horizon 90 at reflection point 50.

Conventional imaging mechanisms, for example, conventional CRAM mechanisms, may model some reflection signals 121, for example, using reflected signals 121 that have the same reflection angle 55, but not necessarily the same arrival direction 57. These signals 121 may include primary and multiple signals.

An imaging mechanism in accordance with an embodiment of the present invention may isolate or recognize primaries (or ignore multiples), or suppress substantially high amplitude multiples, for example, substantially simultaneously to imaging the primaries. Suppression or ignoring of multiples substantially simultaneously to imaging may be achieved, for example, by integrating a beam stack mechanism, for example, a LSS operator, into an imaging mechanism, for example, a CRAM mechanism. An imaging mechanism in accordance with an embodiment of the present invention may image substantially only primary seismic data.

In one embodiment, an imaging mechanism that includes an LSS operator may image reflection points 50 using reflected signals 121 with arrival directions 57 substantially specific to primaries.

Figure 3:
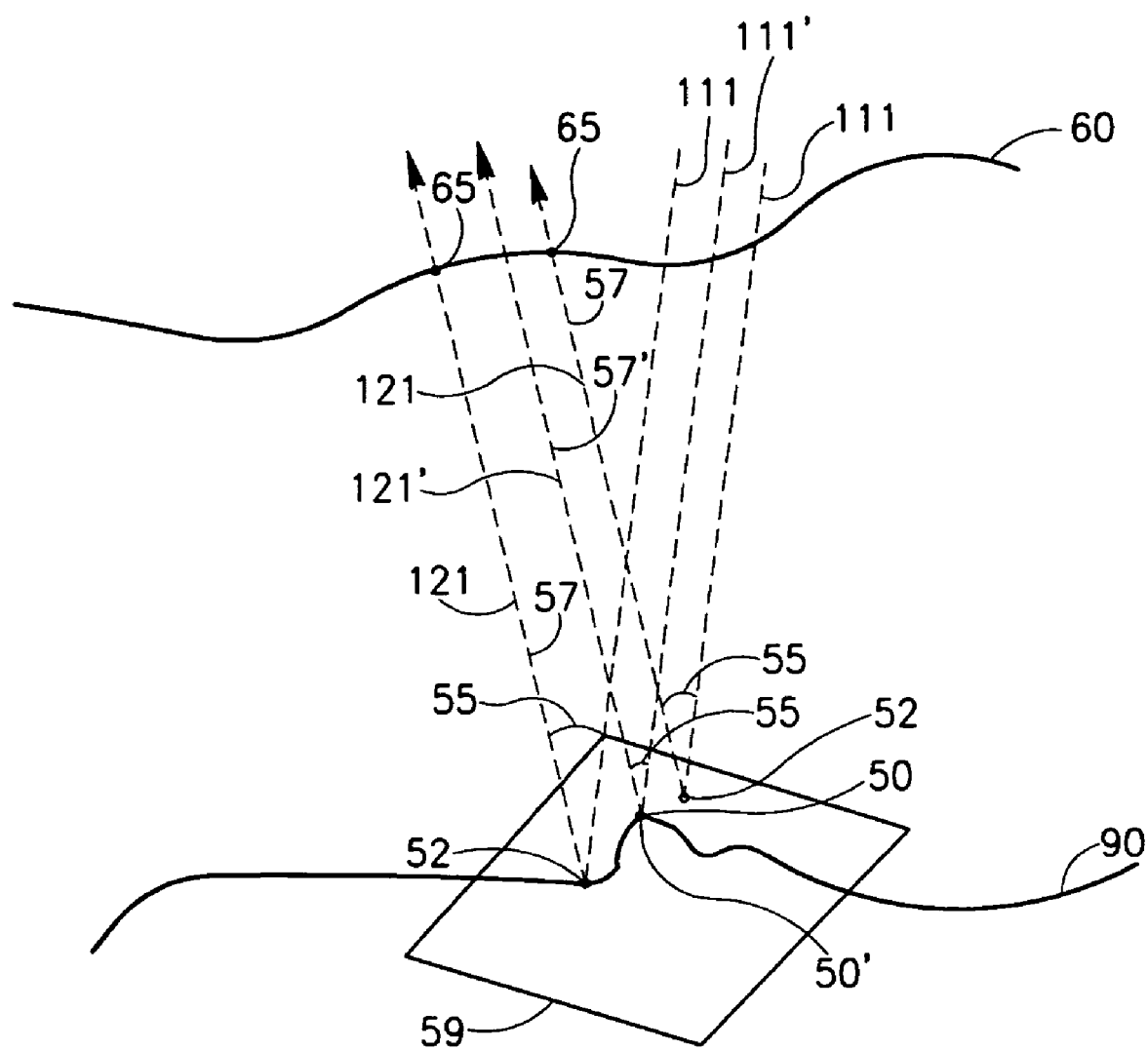
FIG. 3 is a schematic illustration of a plurality of incident and reflected signals propagating through a cross-section of a subsurface structure according to an embodiment of the invention.

Reference is made to FIG. 3, which is a diagram of a plurality of incident signals 111 and corresponding reflected signals 121 of FIG. 2, according to one embodiment of the invention.

A modeling mechanism may generate a simulated reflection field. The modeling mechanism may generate and trace the wave propagation of center signals 121', for example, by simulating pair of rays that may correspond to simulated center signal 121'. Each center signal 121' may correspond to a pair of rays that includes a center signal 111' that may meet the center signal 121' at image point 50'. A modeling mechanism according to one embodiment of the present invention, may substantially only generate ray pairs or corresponding central signals 121' that are primaries. Other methods or processes for modeling may be used.

The modeling mechanism may simulate an array of ray pairs, for example, by shooting a fan of rays. Each ray may span a simulated subsurface location, for example, from a simulated image point 50', to a specific simulated free surface location. Simulated rays may be grouped in pairs. For example, both rays in a ray pair may have the same image point 50' and a substantially different free surface location. One ray may be considered a shot ray and may have a free surface location with shot location coordinates. The other ray may be considered a receiver ray and may have a free surface location with receiver location coordinates. Each ray pair may correspond to a simulated primary center signal 121'. For each simulated ray pair and corresponding center signal 121', the modeling mechanism may also compute signal properties that may include, for example, travel times and arrival directions 57'.

In one embodiment, a modeling mechanism may simulate reflected events or center signals 121' that are substantially only primaries. Each simulated primary center signal 121' or corresponding image point 50' may correspond to a reflection point 50 shown in FIG. 2. Each image point 50' may be a simulated model point of a reflection point 50. Reflected signals 121 of the seismic data field may be imaged if they share certain signal properties or conditions with a primary center signal 121'. In one embodiment, substantially only reflected signals 121 that are primaries share certain signal properties with simulated primary center signals 121'. Thus, the modeling mechanism may simulate a primary reflection field.

A neighborhood may be defined around center signal 121'. For example, the neighborhood around center signal 121' may correspond to a simulated neighborhood around the free surface shot location of a shot ray that corresponds to the center signal 121'. All reflected signals 121 that span this neighborhood may be neighboring reflected signals 121.

Neighboring reflected signals 121 may be used to image reflection point 50, for example, if these signals 121 have the appropriate travel times and substantially the same angle of reflections 55 and free surface arrival location 65 and arrival direction 57 as center signals 121'. Thus, multiple energy neighboring reflected signals 121, having the appropriate travel times, angle of reflections 55 and free surface arrival location 65, but substantially different arrival directions 57, as primary center signals 121', are typically not imaged. In one embodiment, an imaging mechanism may image a plurality of seismic data points, for example, if they have substantially similar arrival direction as an arrival direction of a modeled primary ray, for example, center signal 121'. The plurality of reflected signals may include center signal 121' and neighboring signals 121. The plurality of reflected signals may be used to image reflection point 50. For example, the plurality of reflected signals may be integrated, for example, by a beam stack mechanism, such as a LSS operator, to image reflection point 50. If a primary center signal 121' and neighboring reflected signals 121 have signal properties including substantially the same arrival directions, then neighboring reflected signals 121 may be primaries. Thus, the imaging mechanism may integrate substantially only primary reflections.

Imaging mechanisms may include modeling mechanisms, for example, ray tracing mechanisms. Modeling mechanisms may generate simulated center signals 121' that may include travel times and arrival directions 57' appropriate to substantially only primaries. Modeling mechanisms may generate properties of reflected rays 121 that may be imaged. For example, if a reflected signal 121 lies in a neighborhood of simulated center signal 121' and meets conditions appropriate to substantially only primaries in that location, then an imaging mechanism may image the reflected signal 121. For example, an imaging mechanism, including a beam stack mechanism, may image a plurality of signals that may include center signal 121' and all neighboring reflected signals 121 that meet properties or conditions for substantially only primaries. An imaging mechanism may compute or generate these properties or conditions using a modeling mechanism, such as a ray tracing mechanism. Conditions or properties may include signal orientation properties, for example, arrival directions 57, travel times, reflection angles 55, for example, the half opening angle and the azimuthal rotation, or any other properties substantially unique to primary reflected signals 121.

In one embodiment, these properties may be used by an imaging mechanism, for example, a CRAM mechanism, as a condition for imaging. For example, a CRAM mechanism may associate a plurality of reflected signals, both primary and multiple reflected energies, with an angle of reflection 55. The CRAM mechanism may include a beam stack mechanism, for example, a LSS operator. This imaging mechanism may image primary reflected signals 121 or corresponding reflection points 50 that meet conditions, for example, travel times and signal orientations, such as reflection angles 55, arrival location, arrival directions 57 and other suitable signal properties that may correspond to a primary center signal 121' with image point 50'. Reflection signals 121 with reflection angle 55, travel time and various other properties appropriate to primaries may be provided by an imaging mechanism, using a modeling mechanism, for example, a ray tracing mechanism. Reflection signals 121 with arrival direction 57 appropriate to primaries may be provided by an imaging mechanism, using a beam stack mechanism, such as a LSS operator. Some imaging properties or conditions may be generated by other mechanisms. For example, the arrival location 65 of reflected signal 121 may simply be recorded by a receiver 120. Different or additional conditions may used for imaging reflected signals 121.

Typically, the appropriate travel times for primary neighboring reflected signals 121 are different from travel times for the corresponding central ray 121'. Travel times of primary reflected signals 121 may be a property or condition, or one of a set of properties or conditions used to filter out multiple energies, for example, multiple neighboring reflected signals 121. The appropriate travel times for primary neighboring reflected signals 121 may be calculated from central rays by for example extrapolating along the local dip. The appropriate travel time for primary neighboring reflected signals 121 may relate to travel time perturbations between central ray 121' and the neighboring data points 121. Such time perturbations may be calculated using for example the local arrival direction of the reflected signals at free surface 60. Travel time perturbations between central ray 121' and the neighboring image points 50 may be calculated using the local dip at the image points 50. If an imaging mechanism includes a beam stack mechanism, according to an embodiment of the present invention, time perturbations may be calculated for example using paraxial ray theory as is known in the art.

In one embodiment, a plurality of reflected signals may be selected such that center signal 121' and neighboring reflected signals 121 may have reflection locations 50 and 52, respectively, that may lie in a single reflection plane 59. An arrival direction 57 may be associated with substantially all of the neighboring reflected signals 121 that may be imaged. An arrival direction 57 may be defined, for example, by a directional vector relative to reflection plane 59. The arrival direction 57 may be, for example, a perpendicular vector relative to plane 59. The arrival direction vector 57, for all neighborhood reflected signals 121 that lie in plane 59, may be substantially similar.

In one embodiment, if the arrival direction 57 of a neighboring reflected signal 121 is substantially the same as the direction 57' of the center ray 121', then the neighboring reflected signal 121 may be used, for example, to generate local plane waves that may be used to image reflection point 50.

In one embodiment, reflected signals 121 may be summed uniformly for each reflection angle 55, where all reflected signals 121 may be taken into account. Thus the imaging mechanism may obtain reflected signal data with continuous amplitude which may preserve the phase of the reflected signals 121 for a wide range of reflection angles 55.

In one embodiment, all image points 50' may be evenly illuminated, so that each simulated image point 50' may correspond to a central signal 121'. For each central signal 121', a beam stack mechanism may image or integrate substantially all primary neighboring reflected signals 121. These neighboring reflected signals 121 may have the same arrival direction 57' as central signal 121' and the appropriate travel times, for example, corresponding to time perturbations computed from the central signal 121'.

In one embodiment, neighboring reflected signal 121 corresponding to center signal 121' with appropriate travel times, but with arrival directions 57 that are different or substantially different than the central signal's 121' arrival direction 57', may not be recognized or imaged or may be internally attenuated. These non-imaged signals may be substantially high amplitude multiples. Substantially only neighboring reflected signals 121 with appropriate travel times and with arrival directions 57 that are substantially similar to the arrival direction 57' of central signal 121' may be imaged. These imaged neighboring reflected signals 121 may be primaries.

In one embodiment, from each image point 50', denoted herein by, m, a plurality of reflected model signals may be generated by a modeling mechanism, for example, each with uniform emergence angle increment, denoted herein by, dv. Properties such as travel times, geometrical spreading and phase rotation factors may be calculated by the modeling mechanism for each reflected signal 121 by known methods.

Each reflected signal 121 may be imaged, for example, by summing over all reflected signals 121 that may reflect from an image point 50', m, with substantially similar reflection angle 55, θ, and various arrival directions 57 (dip angles), ν. The migration formula for the angle dependent reflectivity may be given by for example:

$$R(\theta,m)=\int d\nu W(\nu,\theta,m) H^{(1-n)}\{F[G(s,r;\tau_D)]\} \qquad (1)$$

where s(ν,θ,m) and r(ν,θ,m) may respectively be the transmission location and receiver or arrival location 65 on free surface 60. $\tau_D(\nu,\theta,m)$ may be the travel time of reflected signal 121. W(ν,θ,m) may be the amplitude weighting factor, given by for example $$W(v, \theta, m) = \frac{\cos\theta}{A(s, m)A(m, r)} S, \text{ where}$$

$$A(s, m) = \sqrt{\frac{c(m)}{8\pi|J(s, m)|}}.$$

c(m) may be the velocity of reflected signal 121 at reflection point 50 and J(s, m) may denote the geometrical spreading. H may denote a transformation, for example, the Hilbert transform, and n may be a KMAH index, for example, the sum of all phase rotations along a reflected signal 121. This transformation may account for the total phase shift caused by caustics, for example, where two neighboring reflected signals 121 cross paths. A LSS operator, may be given by for example $$G(s, r, \tau_D) = \int_D \int_S d\xi_s \int_D \int_R \xi_r U(s + \xi, r + \xi, \tau_D + p_s\xi_s + p_r\xi_r),$$

where the operator may integrate a plurality of reflected signals over a neighborhood of central signal 121'. Other suitable beam stack mechanisms may be used. Neighborhood reflected signals 121 may span a neighborhood around central signals 121'. This neighborhood may be defined by a neighborhood around the free surface shot location and a neighborhood around the free surface receiver location of the shot and receiver rays that correspond to the center signal 121'. DS may be the surface area of the neighborhood around the shot location and DR may be the surface area of the neighborhood around the receiver location. The size of these areas may be proportional to, for example, what is known as the Fresnel zone, which may be calculated along the central signal 121' for each neighborhood. Other suitable sizes may be used. $P_s$ and $P_r$ may be horizontal slowness vector components, where ξ may be the distance from a neighborhood reflection signal 121 to central signal 121'.

Images generated by an imaging mechanism in accordance with an embodiment of the present invention, may include one, two, two and a half, or three dimensional images. Two or two and a half dimensional images may represent cross-sections of three dimensional models. For example, a two and a half dimensional model may approximate a three dimensional model with no variation along an axis.

For the 2.5-dimensional case, S may represent the out-of-plane spreading factor. $S=\sqrt{\sigma(s,m)+\sigma(m,r)}$, where σ may be the out of plane spreading, which may, for example, be defined by the integral along the ray $\sigma=\int ds\, c$, where s may be an arc length along reflected signal 121. For the two-dimensional (2D) and three-dimensional (3D) situations, S=1.

F may be a time filter applied to the pre-stack input traces U. In the 3D situation, F may be the time derivative. In the 2.5D and 2D cases, F may represent the anti-casual half-derivative with respect to time.

Other formulae and sets of formula may be used.

A plurality of reflected signals, including center signal 121' and corresponding primary neighboring reflected signals 121, may be formed into beam stacked events, for example, local slant stacked events, by an imaging/migration mechanism in accordance with an embodiment of the present invention. The local slant stacked events, formed using center signals 121' with image point 50', may be used to image corresponding reflection points 50.

For example, an output-driven migration mechanism, such as, for example, a CRAM mechanism, may generate reflected events using the input data. For example, the input data may be averaged, integrated or combined in any suitable way. For example, in an input-driven Kirchhoff migration, each stacked trace or generated reflected event may be migrated individually, for example, by spreading out the reflected event's data points along a model space. Although the local slant stack operation may increase the time of imaging computation, this increase may be substantially negligible compared to the time required to migrate a single event through the local image points.

In one embodiment, an imaging mechanism may include a migration mechanism, for example, a CRAM ray-based migration/inversion mechanism, that typically operates in the depth domain. A ray-based migration technique, such as a CRAM mechanism, in accordance with embodiment of the present invention, may be used in both the time and depth domain.

Since conventional CRAM migration mechanisms do not include one dimensional approximations, they typically operate in the depth domain, for example, using a three dimensional model. In the depth domain, the model or simulated image may be a three dimensional model, for example, a velocity grid, where velocity may vary along three dimensions. Thus, a three dimensional modeling mechanism may be used.

A CRAM migration mechanism, in accordance with embodiment of the present invention, may be used in the time domain. In the time domain, a one dimensional model may be used. In one embodiment, the three dimensional model space, used in depth domain migration, may be approximated by locally varying one dimensional models. For example, the three dimensional velocity grid that may be used in depth domain migration may be approximated locally as a one dimensional grid, where velocities may change only along the vertical axis. Thus, a one dimensional modeling mechanism, for example, a ray tracing mechanism that traces along curved rays mechanisms, may be used in accordance with an embodiment of the present invention.

An imaging process or mechanism according to some embodiments may only recognize, input or image data that meet a predetermined set of conditions. For example, the predetermined set of conditions may include conditions that are unique to primaries. For example, a predetermined set of conditions may include specific arrival directions, arrival locations, travel times, reflection angles, azimuthal rotational directions, or any other suitable conditions or combination of conditions. Typically substantially only primaries and not multiples meet these predetermined conditions. However, some multiples may meet these predetermined conditions. In one embodiment, substantially only primaries may be imaged.

Imaging or migration mechanisms, for example, CRAM mechanisms, modeling mechanisms, for example ray tracing mechanisms, beam stack mechanisms, for example, LSS operations, or various other processes or mechanisms may be used to compute or generate conditions appropriate to primaries. In one embodiment, seismic data may be imaged using a migration mechanism in the time domain.

In one embodiment of the present invention, an imaging mechanism may process seismic event data that may include both primaries and multiples, and may generate images that relate only to the primaries. For example, in one embodiment the modeling mechanism does not read or recognize seismic neighboring reflected signals 121 with arrival directions 57 that differ from the central signal 121' arrival direction 57'. Since neighboring reflected signals 121 that are multiples typically have arrival directions 57 that differ from the central signal 121' arrival direction 57', the imaging mechanism may not use or recognize multiples for imaging. The imaging mechanism may be "blind" to multiples.

Figure 4:
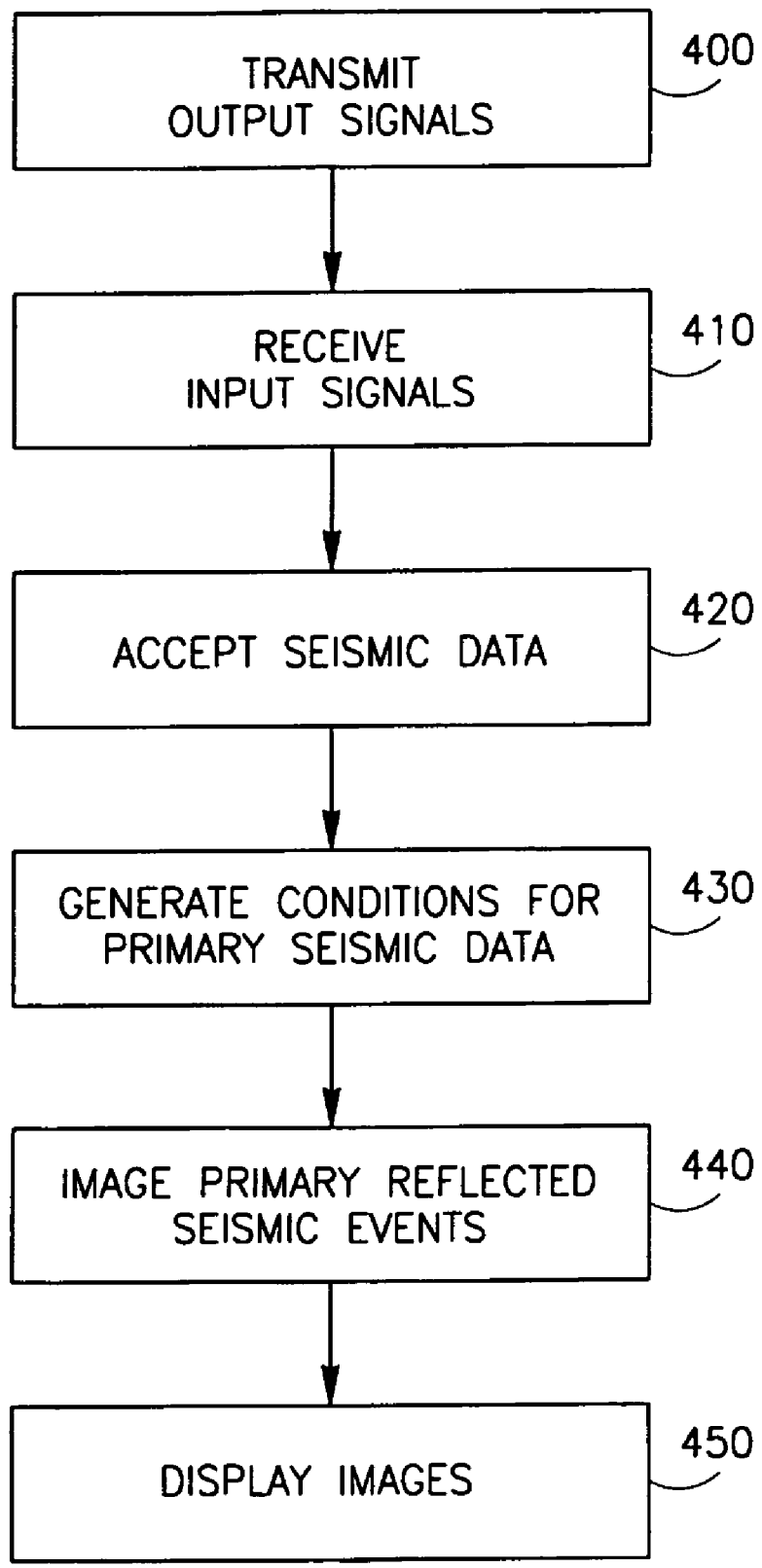
FIG. 4 is a flow diagram of a method according to an embodiment of the present invention.

Reference is made to FIG. 4, which is a flow chart of a method in accordance with an embodiment of the invention.

Referring to FIG. 4, in operation 400 a transmitter may transmit output signals. An instruction or command may cause a transmitter to transmit output signals. The instruction may include directions for signal properties of the transmitted output signals. The instruction may be programmed in an external device or program, for example, a computing system, or into the transmitter itself.

The output signals transmitted by the transmitter may be, for example, signals that are incident on geologic features or points. The output signals may include, for example, compression or acoustic waves. The transmitter may transmit output signals with specific signal properties, for example, time or frequencies of transmission, frequencies or wavelengths of signals, signal velocities, directions, angles or locations of origin of transmission, for example, where the transmitter may be moving. The transmitter may store data that may correspond to output signals or the data may be stored in any other suitable place, for example, in a computing system, in a memory, etc.

In operation 410, a receiver may receive input signals. The input signals may be, for example, reflected signals. An input signal in operation 410 may be the reflection of the output signal transmitted in operation 400. For example, the incident output signals that may be transmitted in operation 400 may reflect at a reflection point along a subsurface horizon, as reflected input signals. An input signal may be said to correspond to an output signal if it is a reflection of that output signal.

The receiver may receive input signals with specific signal properties, for example, the time or frequency of receipt, the frequency or wavelength of the signal, the signal velocity, direction, or angle or, the location of the receiver when the input signal was received, for example, where the receiver may be moving. The receiver may store or generate data that relates to the specific signal properties that correspond to input signals. In another embodiment, another suitable unit, for example, a computing system or a memory may store and generate the data that relates to the specific input signal properties.

In operation 420, seismic data may be accepted, at, for example, a computing system. The data may relate to the output signals in operation 400 and/or the input signals in operation 410.

In operation 430, a modeling mechanism or process may generate conditions or properties for primary seismic data. For example, a modeling mechanism may simulate an array of ray pairs, for example, by shooting a fan of rays. Each ray pair may correspond to a simulated primary reflected event or center signal. For each simulated ray pair and corresponding center signals, the modeling mechanism may also generate conditions or properties for primary seismic data that may include, for example, travel times and arrival directions. Other modeling processes or mechanisms may be used.

In operation 440, an imaging mechanism may image primary reflected seismic events. In one embodiment, the imaging mechanism may substantially only image reflected seismic events that meet a set of predetermined conditions or properties. In some embodiments, a relatively small number of multiple events may be imaged. The properties or conditions may be for example specific to primary reflected seismic events in a neighborhood relative to a central signal. The conditions may include for example arrival directions, travel times and angles of reflection. The set of predetermined conditions may include conditions or properties generated in operation 430. In one embodiment, the imaging mechanism may input, recognize or image substantially only primary reflected seismic data. In one embodiment, an imaging mechanism may integrate a plurality of seismic data points that have substantially similar arrival directions to that of a corresponding modeled primary ray, for example, a center signal generated in operation 430. The plurality of seismic data points may also have travel times, reflection angles and azimuthal rotational directions substantially unique to primaries.

The imaging mechanism may use, for example, a CRAM mechanism or process that may construct CRAGs in the reflection angle domain. The CRAM mechanism may image reflected seismic data based on, for example, their angles of reflection. A CRAM mechanism may include a for example ray-based migration/inversion technique or method for the construction of CRAGs. CRAGs may be constructed using conventional wave equation migration mechanisms.

The imaging mechanism may include a beam stack mechanism, for example, a LSS operator. The beam stack mechanism may image a plurality of data points, for example, by summing, integrating or combining primary central signals and neighboring reflected signals that meet a set of predetermined conditions, for example, to image a primary reflected event or reflection point.

The neighboring reflected signals may span a plane. A directional vector (e.g. the perpendicular vector to the plane) may be associated with this plane. The directional vector may be the common arrival direction of all the neighboring reflected signals that span the plane. This plane, and thus the neighboring reflected signals that span the plane, may be selected with the condition that the directional vector may be substantially similar to the arrival direction of the center signal. Thus, using a beam stack mechanism, only reflected signals with the same arrival direction as a center signal may be imaged. In one embodiment, each input signal may be used as a center signal, so that reflected events corresponding to all reflection points may be imaged. Other methods may be used to select reflected signals that have arrival directions substantially unique to primaries.

Primary reflected events may be imaged or formed from a plurality of reflected signals that may include appropriate travel times, subsurface horizon reflection angles and free surface arrival directions, substantially unique to primaries. Thus, the reflected signals from data points of multiples, containing travel times and reflection angles appropriate to primaries, but different arrival directions than primaries, may be ignored or strongly attenuated.

The imaging mechanism may image signals that meet a set of predetermined properties or conditions, for example, specific ray paths, travel times, geometrical spreading, phase rotation factors, angles of reflection, arrival directions or any other conditions substantially specific to primaries.

An imaging mechanism may generate image points, for example, reflection points, that may form a subsurface horizon. For example, the imaging mechanism may use primary reflected events to generate corresponding reflection points. Each such reflection point may be used to form an image of a subsurface horizon.

In operation 450, a display system may display images constructed in operation 440.

Other operations or series of operations may be used.

The foregoing description of the embodiments of the invention has been presented for the purposes of illustration and description. It is not intended to be exhaustive or to limit the invention to the precise form disclosed. It should be appreciated by persons skilled in the art that many modifications, variations, substitutions, changes, and equivalents are possible in light of the above teaching. It is, therefore, to be understood that the appended claims are intended to cover all such modifications and changes as fall within the true spirit of the invention.

I claim:

1. A method of imaging seismic data, the method comprising:
   accepting seismic data points; and
   integrating a plurality of the seismic data points if the seismic data points have substantially similar arrival directions and travel times to that of a corresponding modeled primary ray.

2. The method of claim 1 comprising integrating substantially only primary reflections.

3. The method of claim 1 comprising integrating the plurality of the seismic data points using a beam stack mechanism.

4. The method of claim 1, comprising generating one image point using the plurality of the seismic data points.

5. The method of claim 1, wherein the plurality of the seismic data points each have substantially similar reflection angles and azimuthal rotational directions to that of the corresponding modeled primary ray.

6. The method of claim 1, wherein each of the plurality of the seismic data points reflect off of a subsurface structure at substantially similar locations.

7. The method of claim 1, wherein the plurality of the seismic data points are neighboring data points.

8. The method of claim 1, wherein the plurality of the seismic data points span a plane.

9. A method of imaging seismic data, the method comprising:
   accepting seismic data; and
   imaging seismic data points that substantially meet a set of predetermined conditions, wherein the set of predetermined conditions includes at least arrival direction and angle of reflection.

10. The method of claim 9 wherein substantially only primary seismic events meet the set of predetermined conditions.

11. The method of claim 9 wherein imaging comprises imaging substantially only primary reflected seismic events.

12. The method of claim 9 wherein the set of predetermined conditions includes at least travel time, arrival location, and azimuthal rotational directions.

13. The method of claim 9 wherein imaging comprises imaging a plurality of seismic data points to generate one primary data point.

14. The method of claim 9 wherein imaging seismic data comprises generating common reflection angle gathers.

15. The method of claim 9 comprising imaging seismic data using a beam stack mechanism.

16. The method of claim 9 comprising imaging seismic data using a migration mechanism in a time domain.

17. A system comprising:
   a memory to store data corresponding to seismic data points; and
   a processor to accept seismic data points; and integrate a plurality of the seismic data points if the data corresponding to the seismic data points include substantially similar arrival directions and travel times to that of a corresponding modeled primary ray.

18. The system of claim 17, wherein the processor is to integrate substantially only primary reflections.

19. The system of claim 17 wherein the processor is to use a beam stack mechanism.

20. The system of claim 17, wherein the processor is to generate one image point using the plurality of the seismic data points.

21. A system comprising:
   a memory to store seismic data; and
   a processor to accept the seismic data; and image seismic data points having seismic data that substantially meet a set of predetermined conditions, wherein the set of predetermined conditions includes at least arrival direction and angle of reflection.

22. The system of claim 21, wherein the processor is to image substantially only primary reflections.

23. The system of claim 21, wherein the plurality of seismic data points have arrival directions that are substantially similar to the arrival direction of a corresponding modeled primary ray.

24. The system of claim 21, wherein the processor is to use a beam stack mechanism.

25. The system of claim 21, wherein the processor is to generate one image point using the plurality of seismic data points.

* * * * *